BEST AVAILABLE COPY BEST AVAILABLE COPY

J. MADDOCK, dec'd.

Assignor by mesne Assignments to J. Fishbaugh.

CARRIAGE HOUNDS.

No. 7,317. Reissued Sept. 26, 1876.

WITNESSES

Edw. C. Bittingham

F. O. McCleary

John Fishbaugh,
assignee of
John Maddock.
By Leggett & Leggett
Attorneys

THE NORRIS PETERS CO., PHOTO-LITHO., WASHINGTON, D. C.

UNITED STATES PATENT OFFICE.

JOHN FISHBAUGH, OF TIFFIN, OHIO, ASSIGNEE, BY MESNE ASSIGNMENTS, OF JOHN MADDOCK, DECEASED.

IMPROVEMENT IN CARRIAGE-HOUNDS.

Specification forming part of Letters Patent No. 33,355, dated September 24, 1861; reissue No. 7,317, dated September 26, 1876; application filed May 12, 1876.

*To all whom it may concern:*

Be it known that JOHN MADDOCK, late of Dubuque, county of Dubuque, State of Iowa, did invent a new and useful Improvement in Hounds of Wheel Vehicles; and I do hereby declare that the following is a full, clear, and exact description of the same, reference being had to the annexed drawings, making a part of this specification, in which—

Figure 1:
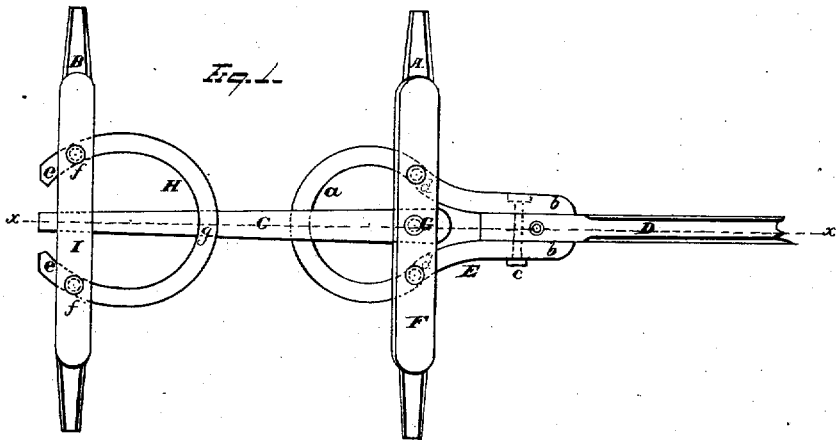
Figure 2:
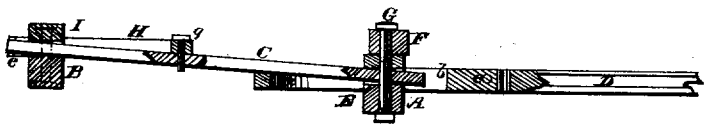
Figure 3:
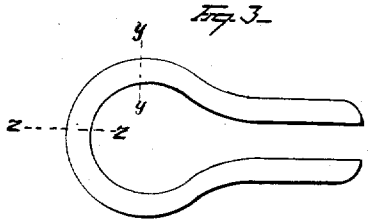
Figure 4:
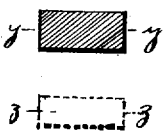

Figure 1 is a plan or top view of a vehicle embodying the invention. Fig. 2 is a longitudinal section of same, taken on line *x x*, Fig. 1. Figs. 3 and 4 represent plan and sectional views of the hound through lines *y y* and *z z*.

Similar letters of reference indicate similar parts in the several figures.

This invention relates to an improvement in the hound of wheeled vehicles, whereby the construction of the running-gears of wheel-vehicles is greatly facilitated, considerable stuff or stock saved, and durability increased.

To enable those skilled in the art to fully understand and construct the invention, I will proceed to describe it.

A represents the front, and B the back axle of a vehicle; C, the perch or reach, and D the draft-pole. E represents the front hound, which is formed of a single piece of wood, steamed and bent so that its back part *a* shall form a loop in a single unbroken length or piece, extending from the front of the axle, back and around again to the front of the axle, the two forward ends forming jaws between which the pole is inserted, and which receive and sustain the strain from the pole.

The piece which forms the hound E is preferably cut away along its rear or loop end, where the material is bent so that its sectional area at the rear central portion adjacent to perch or reach shall be less than at other places, and shall gradually increase in sectional area as the ends that sustain and embraces the pole are approached. As shown in Figs. 3 and 4, the cross-section of the hounds through the bent portion *z z* is of less sectional area than the portion through that portion of the hound denoted by the letters *y y*.

The back end of the draft-pole E is fitted between the projecting forward ends *b b* of the hound, and is secured in proper place by a bolt, *c*. The hound E passes through the front axle A, and is firmly secured therein.

In the drawings, bolts *d d* (shown by dotted lines in Fig. 1) serve to so fasten the hound, and the front bolster F and front axle are fastened by a king-bolt, G, in the usual manner. The hound E, thus constructed and applied, answers, and in fact forms, a part of the fifth-wheel of the vehicle. H represents the back hound or brace of the vehicle. This hound is formed of a piece of wood steamed and bent so as to form a loop, as shown clearly in Fig. 1. The ends *e e* of this hound pass between the back axle B and back bolster I, and the hound is secured between said axle and bolster by bolts *f f*. The front part of hound H is connected to reach C by a bolt, *g*.

By this arrangement it will be seen that the running-gear of wheel-vehicles may be constructed with great facility, as all the mortises and tenons required in the ordinary hounds are avoided, while the hounds constructed according to this invention are exceedingly strong and durable, and may not only be constructed economically, but also be applied to the vehicle very expeditiously at a small cost.

I am not aware that the front hound of a wheel-vehicle has ever before been made in a continuous length of a single piece of material extending from in front of the front axle, back and around, and forward again to the place of said axle. Nor am I aware that the front hound of a wheel-vehicle has ever before been made of a single piece of material having its rear end bent into the form of a loop, and having its forward ends extending through to the front of the axle, and there serving as a means for attaching the pole to the vehicle. Nor am I aware that the front hound of a wheel-vehicle has ever before been made of a single piece of material bent into a loop form at its rear, and with its forward ends projecting to the front of the axle and forming jaws, between which the tongue or draft-pole has been inserted. Nor am I aware that the front hound of a wheel-vehicle has ever before been made of a single piece of material bent into the form of a loop at its rear, and having the material dressed away on the bent portion so that the area in cross-section along the bent portion shall be less than the area in cross-section on the straight portions. Nor am I aware that the front hound of a wheel-vehicle has ever before been made of a single piece of material bent to the form of a loop at its rear, and having the area of the cross-section of the middle of the back or bent portion of said hound less than the cross-sectional area at any other portion of said hound. Nor am I aware that the front hound of a wheel-vehicle has ever before been made of a single piece of material with its rear bent to the form of a loop, having its cross-sectional area least at the middle of said back or bent portion, and gradually increasing as the forward ends are approached. Nor am I aware that a front hound of a wheel-vehicle has ever before been made of a single piece of material by first steaming and then bending the said material.

What I claim is—

1. The front hound of a wheel-vehicle, formed in a single length from a single piece of material with its two ends terminating in the front of the front axle, substantially as described.

2. The front hound of a wheel-vehicle, made in a continuous length and of a single piece of material, having its rear part bent to the form of a loop and its ends projecting in front of the front axle, and forming a means for attaching the draft-pole to the vehicle, substantially as described.

3. The front hound of a wheel-vehicle, made of a single piece of material, with its rear portion bent to the form of a loop and having its ends projecting in front of the front axle, and forming jaws between which the draft-pole is inserted.

4. The front hound of a wheel-vehicle, made in a continuous length from a single piece of material, and having the material dressed away on the bent portion so that the sectional dimensions of the bent portion shall be less than that of the straight portions, substantially as described.

5. The front hound of a wheel-vehicle, formed in a single length of a single piece of material, with its rear part bent to the form of a loop, the area of the cross-section at the middle of said bent part being less than that of any other part of said hound, substantially as described.

6. The front hound of a wheel-vehicle, formed in a continuous length of a single piece of material, the cross-section of the said hound being least at the middle of said bent portion and gradually increasing as the ends are approached, substantially as described.

7. The rear hound H of a wheel-vehicle, made in a single continuous length of material bent in the form of a loop, substantially as described.

In testimony whereof, I hereunto sign my name in the presence of two witnesses.

JOHN FISHBAUGH, *Assignee.*

Witnesses:
WELLS W. LEGGETT,
FRANCIS TOUMEY.